(No Model.) 8 Sheets—Sheet 1.

H. LOEWER.
SOLE ROUNDING MACHINE.

No. 502,421. Patented Aug. 1, 1893.

Witnesses:
Joseph A. Crane
C. G. Crannell

Inventor:
Henry Loewer,
By Geo. B. Selden,
Atty.

(No Model.) 8 Sheets—Sheet 2.
H. LOEWER.
SOLE ROUNDING MACHINE.

No. 502,421. Patented Aug. 1, 1893.

Witnesses:
Joseph A. Crune
C. G. Crannell

Inventor:
Henry Loewer,
By Geo. B. Selden,
Atty.

(No Model.)  8 Sheets—Sheet 3.

H. LOEWER.
SOLE ROUNDING MACHINE.

No. 502,421.  Patented Aug. 1, 1893.

Witnesses:
Joseph A. Crane
C. G. Cranwell

Inventor:
Henry Loewer
By Geo. B. Selden
atty (No Model.) 8 Sheets—Sheet 4.
H. LOEWER.
SOLE ROUNDING MACHINE.

No. 502,421. Patented Aug. 1, 1893.

Witnesses:
Joseph A. Crane
C. G. Crannell

Inventor:
Henry Loewer,
By Geo. B. Selden
Atty.

(No Model.) 8 Sheets—Sheet 5.
H. LOEWER.
SOLE ROUNDING MACHINE.
No. 502,421. Patented Aug. 1, 1893.
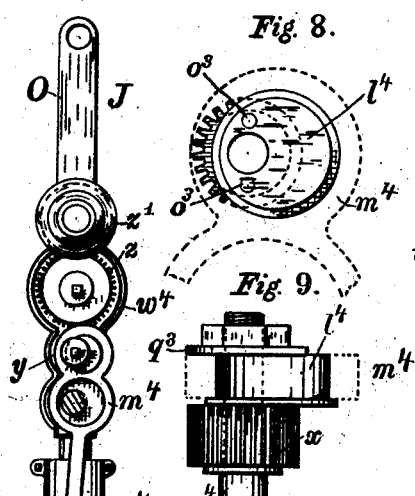
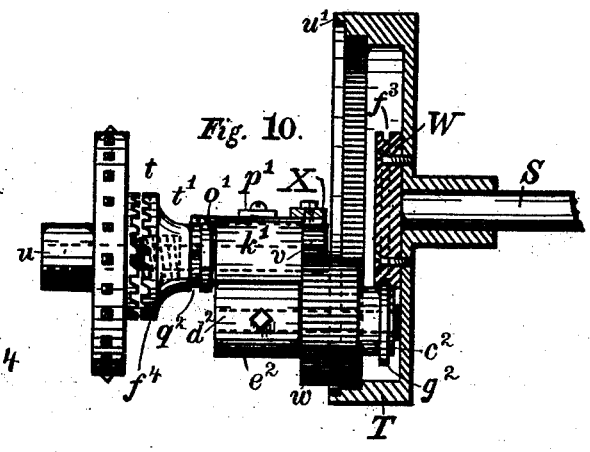
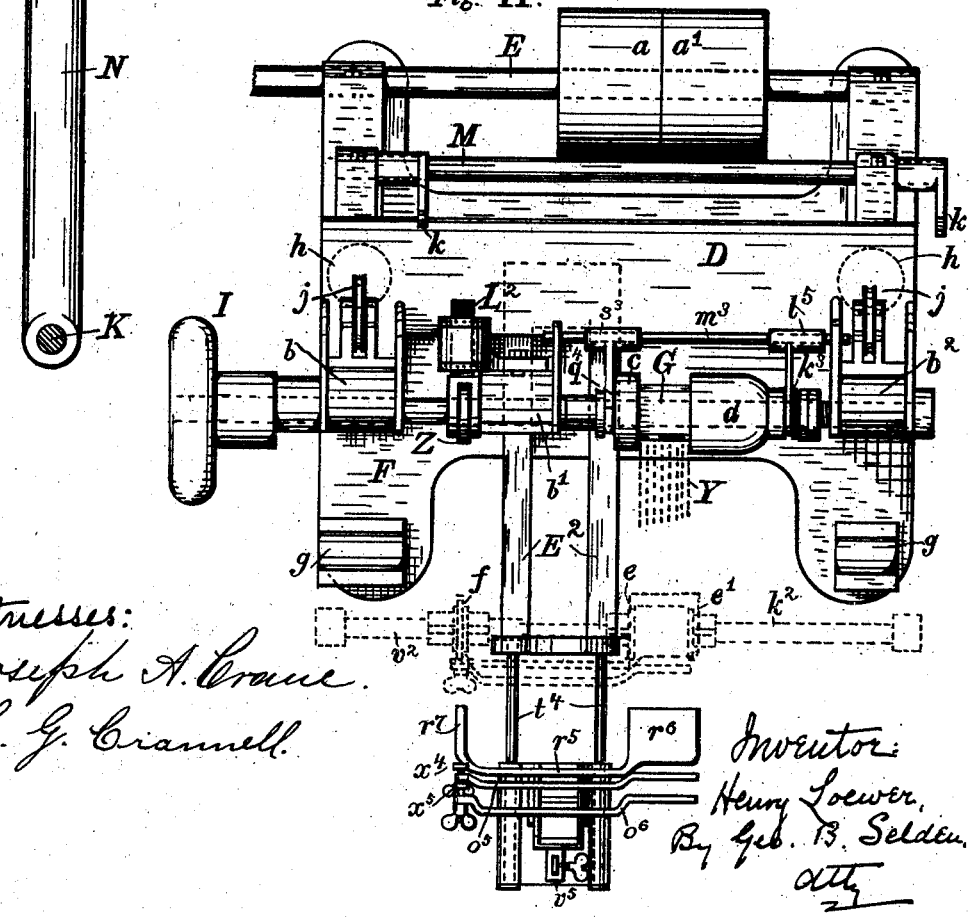
Witnesses:
Joseph A. Crane.
C. G. Crannell.
Inventor:
Henry Loewer,
By Geo. B. Selden
Atty (No Model.) 8 Sheets—Sheet 6.

H. LOEWER.
SOLE ROUNDING MACHINE.

No. 502,421. Patented Aug. 1, 1893.

Witnesses:
Joseph A. Crane
C. G. Crannell

Inventor.
Henry Loewer,
By Geo. B. Selden,
atty.

(No Model.) 8 Sheets—Sheet 7.
H. LOEWER.
SOLE ROUNDING MACHINE.
No. 502,421. Patented Aug. 1, 1893.
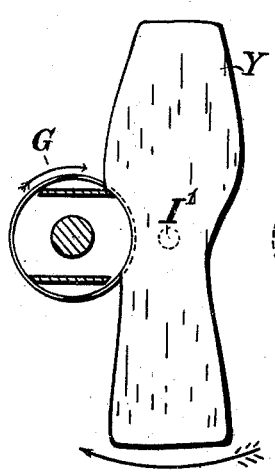
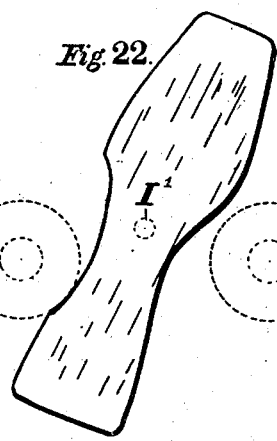
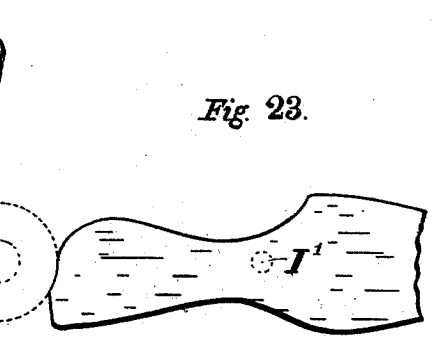
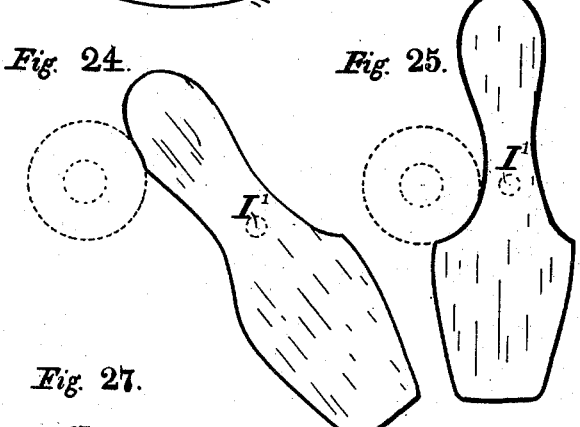
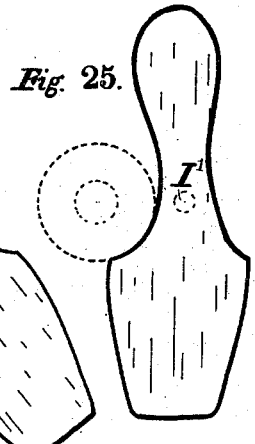
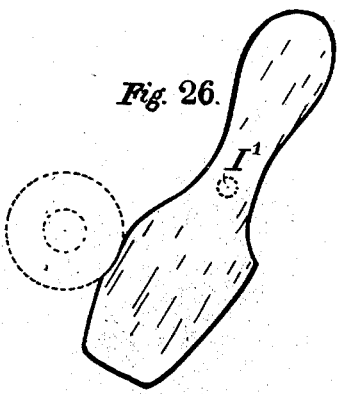
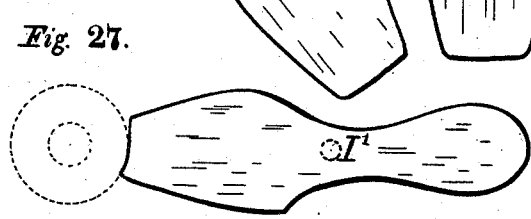
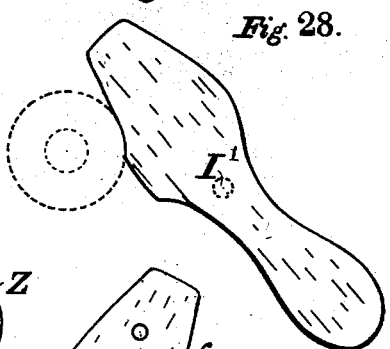
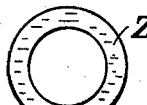
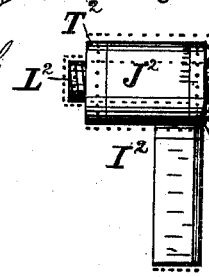
Witnesses:
Joseph A. Crane
C. G. Crannell
Inventor:
Henry Loewer,
By Geo. B. Selden,
Atty.

(No Model.)  8 Sheets—Sheet 8.

H. LOEWER.
SOLE ROUNDING MACHINE.

No. 502,421. Patented Aug. 1, 1893.

Witnesses:
Joseph A. Crane
C. J. Crannell

Inventor:
Henry Loewer,
By Geo. B. Selden,
Atty.

UNITED STATES PATENT OFFICE.

HENRY LOEWER, OF ROCHESTER, NEW YORK, ASSIGNOR, BY DIRECT AND MESNE ASSIGNMENTS, TO THE LOEWER SOLE-ROUNDER COMPANY, OF SAME PLACE.

SOLE-ROUNDING MACHINE.

SPECIFICATION forming part of Letters Patent No. 502,421, dated August 1, 1893.

Application filed October 29, 1892. Serial No. 450,335. (No model.)

*To all whom it may concern:*

Be it known that I, HENRY LOEWER, a citizen of the United States, residing at Rochester, in the county of Monroe, in the State of New York, have invented certain Improvements in Sole-Rounding Machines, of which the following is a specification, reference being had to the accompanying drawings.

My invention relates to certain improvements in sole-cutting or rounding machines, of that type which is described in Letters Patent No. 407,735, dated July 23, 1889,—which improvements are fully described and illustrated in the following specification and the accompanying drawings,—the novel features thereof being specified in the claims annexed to the said specification.

Figure 1:
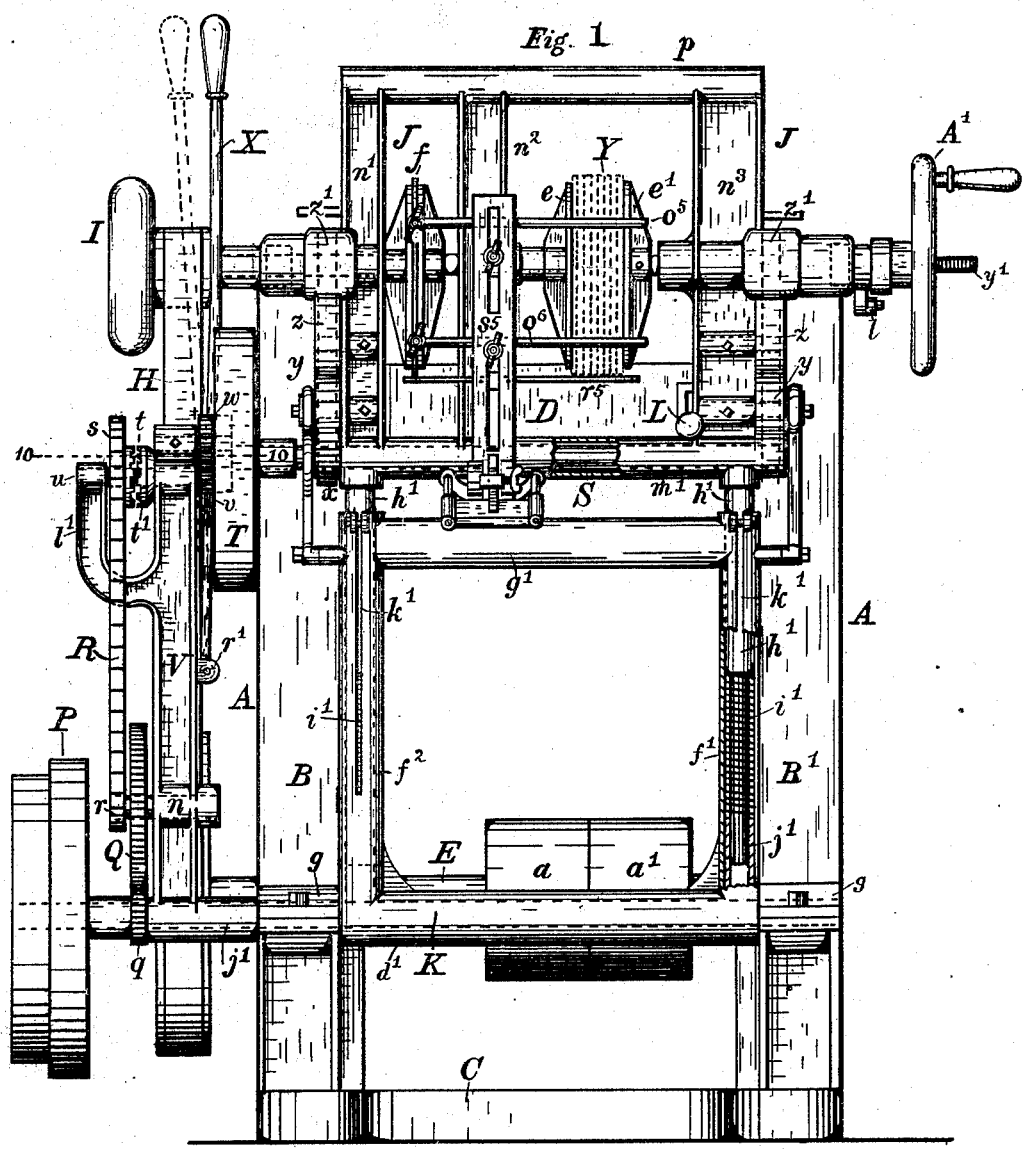
Figure 2:
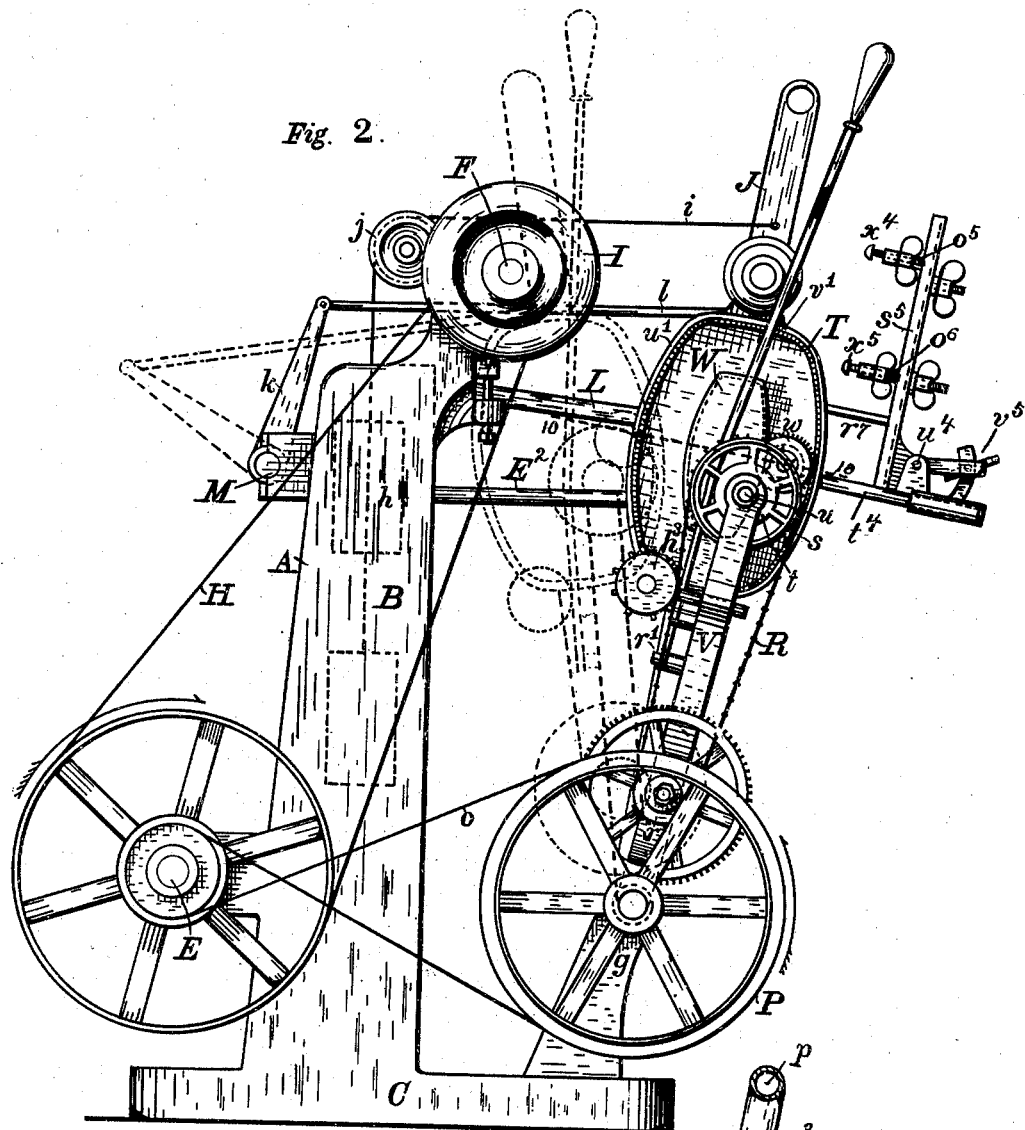
Figure 12:
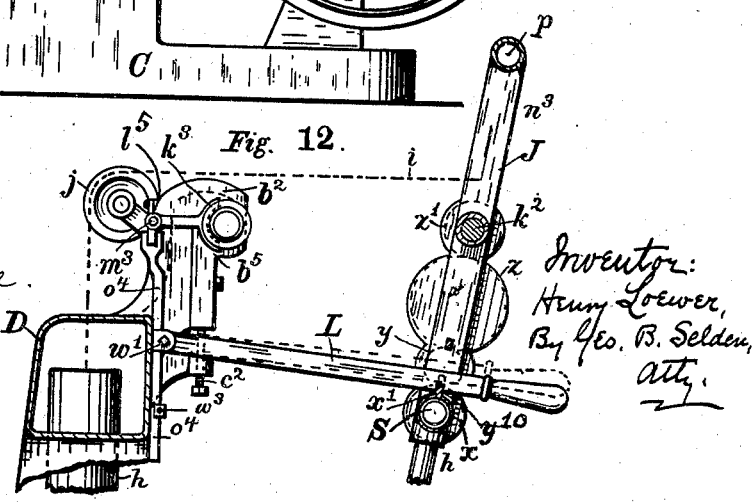
Figure 3:
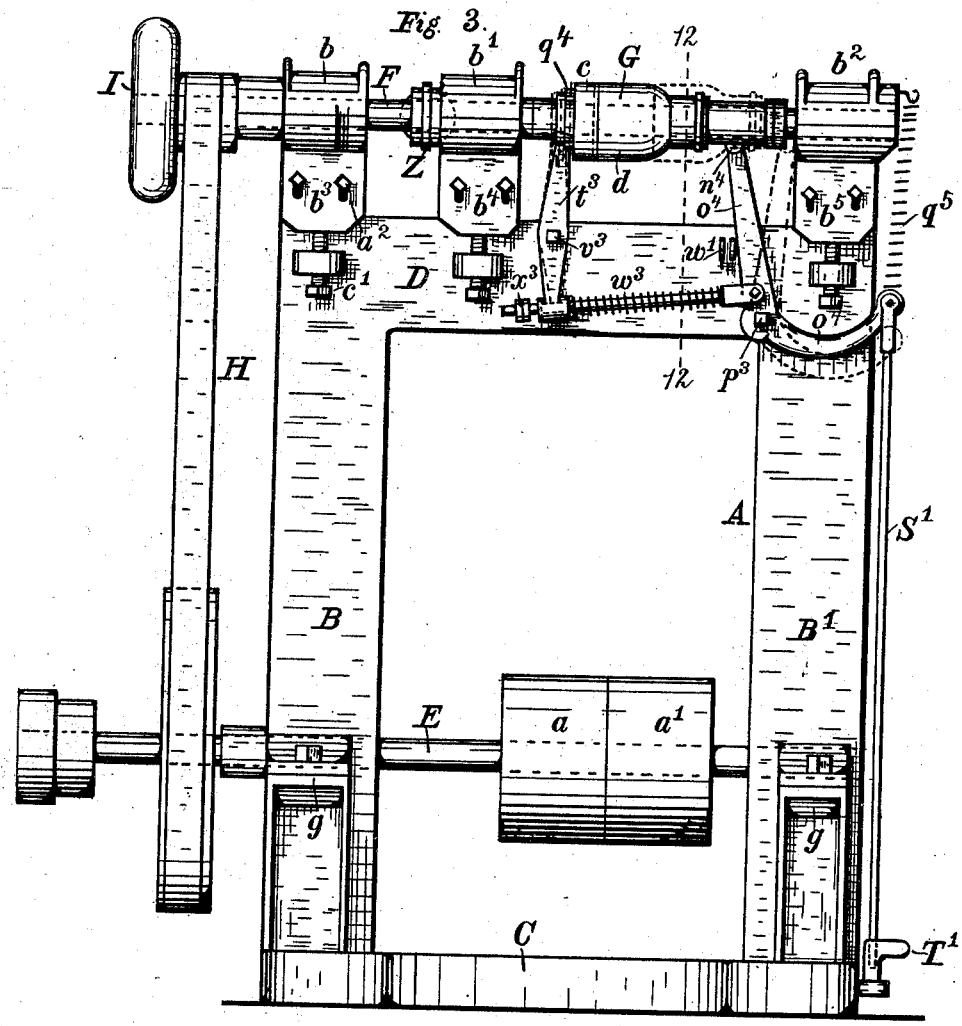
Figure 19:
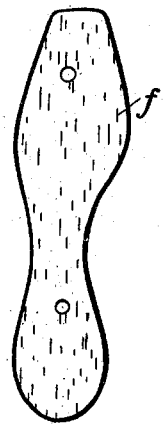
Figure 20:
Figure 4:
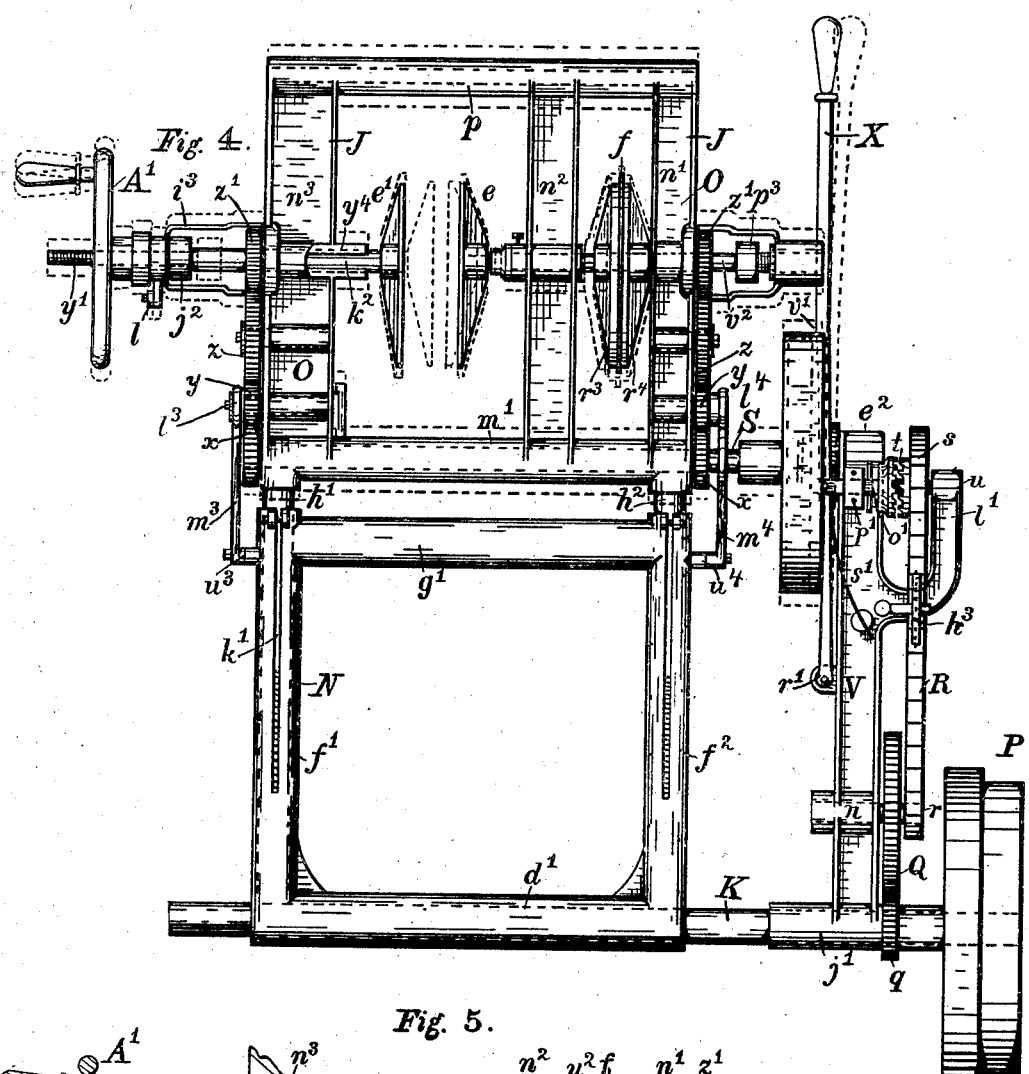
Figure 5:
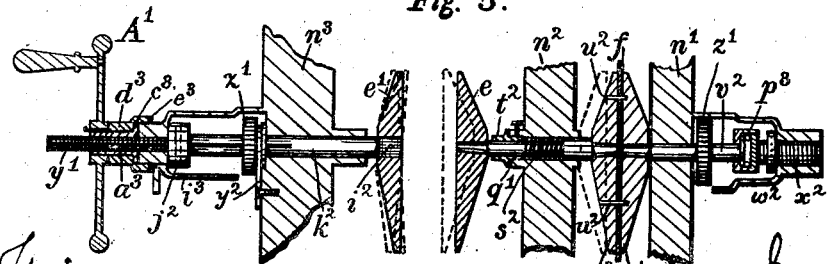
Figure 6:
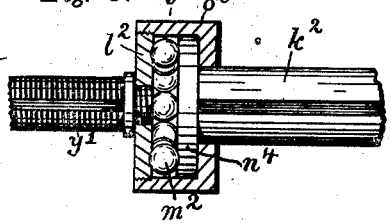
Figure 13:
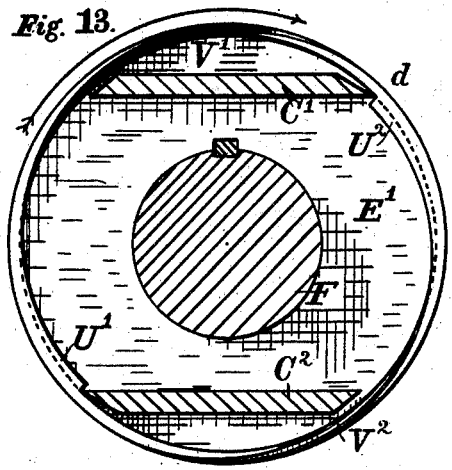
Figure 14:
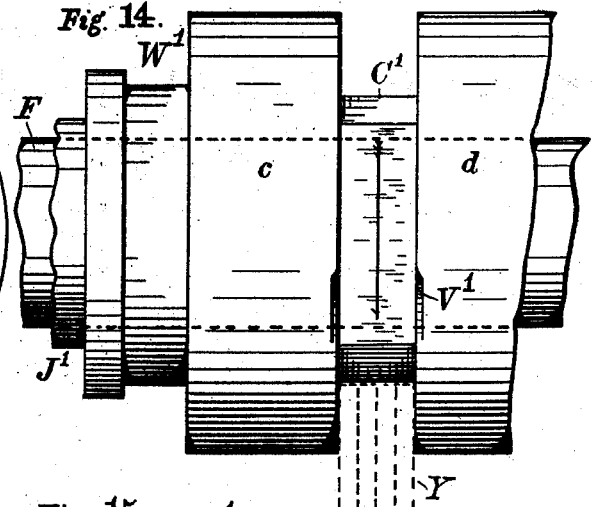
Figure 15:
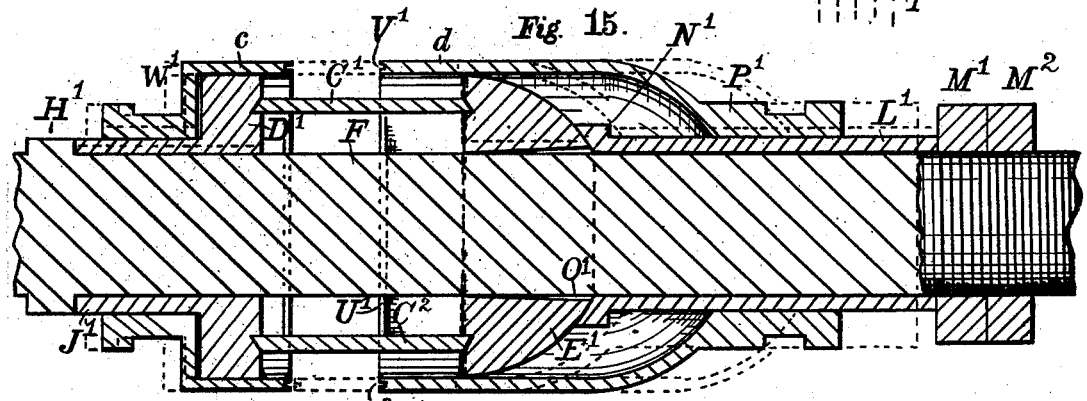
Figure 16:
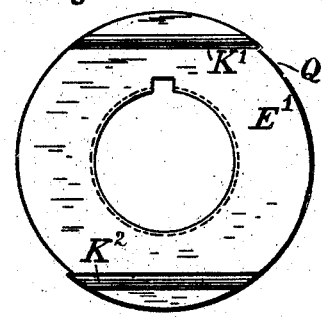
Figure 17:
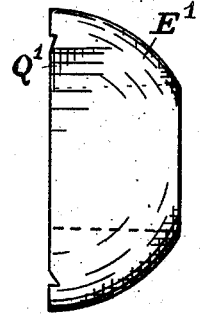
Figure 18:
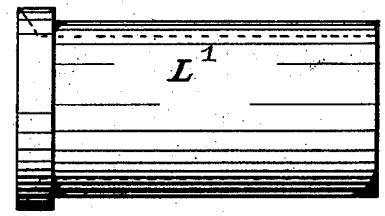
Figure 31:
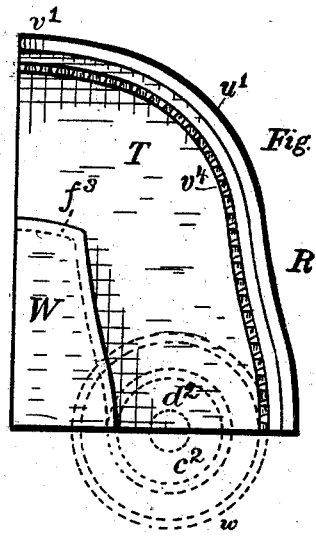
Figure 32:
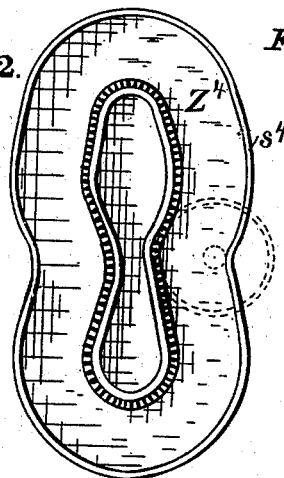
Figure 33:
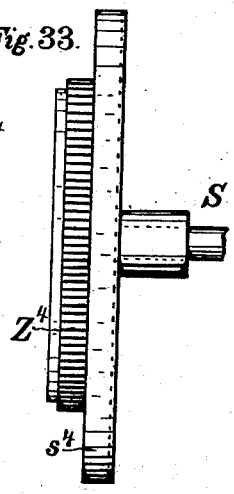

In the accompanying drawings representing my improvements in sole-rounding machines—Figure 1 is a front elevation. Fig. 2 is a side-view as seen from the left hand in Fig. 1. Fig. 3 is a front elevation of the main-frame which carries the cutter-shaft. Fig. 4 is a rear elevation of the movable frame which supports the work and the pattern or former. Fig. 5 is a central longitudinal section of a portion of the movable carrier or frame, showing the sole-clamps, the former-clamps, the anti-friction bearings, and the clamp-screw. Fig. 6 is a section representing one of the anti-friction bearings. Fig. 7 is a side-view of the movable carrier or frame, as seen from the right hand in Fig. 4,—the driving chain and gearing being omitted. Fig. 8 shows one of the eccentrics. Fig. 9 is a side-view of the same. Fig. 10 is a section through the elliptoid or variable speed gear, showing its driving mechanism and clutch, on the line 10—10, Fig. 2. Fig. 11 is a plan view of the main-frame, showing the cutter and the adjustable blank-gages. Fig. 12 is a section on the line 12—12, Fig. 3, showing the parts to the right of said line. Fig. 13 is a transverse section of the cutter, showing the edge of one of the guards. Fig. 14 is a plan view of the cutter and guards. Fig. 15 is a longitudinal section through the cutter and guards. Fig. 16 is a face view of the self-adjusting collar employed in the cutter. Fig. 17 is a side-view of the same. Fig. 18 is a side view of the sleeve. Fig. 19 represents the former. Fig. 20 is a face view of one of the sole-clamps. Figs. 21 to 28 inclusive are diagrams representing the operation of the cutter on the blanks as they are revolved and shifted. Fig. 29 represents the guide for the former detached. Fig. 30 represents the guide and its supporting bracket. Figs. 31, 32 and 33 represent modifications of the variable speed gear.

My improved sole-rounding machine consists essentially of a main-frame, carrying a revolving cutter, and of a movable carriage or frame which supports the sole-blanks while revolving, and presents them to the cutter under the control of a revolving pattern or former in such manner that they are dressed or rounded accurately to the shape and dimensions of the pattern. The movable frame is pivoted or otherwise supported so that the sole-blanks while revolving receive motion to and from the cutter, such reciprocating motion being controlled by the pattern, which revolves with the blanks.

My present invention contemplates mechanism for imparting a variable rotary movement to the blanks while being dressed, mechanism for shifting the axis on which the blanks revolve relatively to the cutter while they are being moved to and from the cutter by the action of the pattern, an improvement in the construction of the cutter whereby the soles are finished with perfectly clean edges, and various other novel features, as hereinafter more specifically described.

A represents the main-frame, which in the construction shown, consists of the uprights or standards B B', the base C, and the cross-bar D. The main-frame supports the driving shaft E, provided with the tight and loose pulleys $a$ $a'$, and the cutter-shaft F, which revolves in the boxes $b$ $b'$ $b^2$ on the cross bar D.

G is the cutter, which in Fig. 3 is shown as covered by the movable guards $c\,d$, which are employed to prevent fuzziness of the edges of the dressed soles. The cutter-shaft is driven from the main-shaft E by suitable pulleys and a belt H. It may be provided with a fly-wheel I, to secure steadiness of rotation.

J is the movable carriage or frame, which supports the intermittently revolving sole-clamps e e', and the pattern or former f, and which, in the form of machine represented, is pivoted on the shaft K supported in suitable journals g on the base C,—its outer end being free to move inward and outward, to and from the cutter. Provision is made for locking the movable frame in the position farthest away from the cutter, as indicated by the full lines in Fig. 2, by means of the notched link L, and, when released from this position, the frame is drawn toward the cutter by the weight h and cords i, passing over suitable corner-pulleys j, Fig. 2. A rock-shaft M, journaled in suitable bearings on the main-frame, is provided at or near its ends with arms k, attached by connecting rods l to the frame J, so that any springing or twisting of the frame during its movements is prevented. A weight on an arm attached to the rock-shaft M will draw the movable frame toward the cutters, but I prefer the weights and cords, as the pressure tending to move the frame toward the cutter is thus rendered uniform. The rods l are pivoted to suitable lugs on the movable frame.

The boxes $b\ b'\ b^2$ for the cutter-shaft F are constructed to permit the movable frame carrying the sole blanks and the former to come as near to the shaft as possible. For this reason the lower portions, $b^3\ b^4\ b^5$ of the boxes are made removable, being attached to the standards on the main-frame by the bolts $a^2$, and forced against the other portions of the boxes by the set-screw $c'$, passing through lugs on the frame.

The movable frame J consists of two portions, one of which N is pivoted to swing on the shaft K, while the other, O, is arranged to reciprocate lengthwise as indicated by the full and dotted lines in Fig. 4. The sole-clamps and former are supported by the reciprocating part O of the frame, which receives a to and fro movement lengthwise as the clamps revolve, so that the sole-blanks are shifted up and down relatively to the cutter during the rounding operation, as hereinafter more fully described, for the purpose of facilitating the cutting by keeping the cutting point as nearly as possible opposite the center of the shaft, and to relieve the friction between the former and the guide.

The lower portion N of the frame, consists of a hollow bar $d'$, the hollow uprights $f'\ f^2$, and the cross-bar $g'$. The bar $d'$ is fitted on the shaft K. The movable portion of the frame O is provided with the rods $h'\ h^2$, which slide in the uprights $f'\ f^2$. The weight of the movable portion O of the frame, is supported by the springs $i''$, Fig. 1, which are placed within the uprights $f'\ f^2$, bearing at their upper ends against shoulders on the rods $h'\ h^2$, and at their lower ends upon the ends of tubes $j'$ inserted in the uprights. The uprights are slit for a distance from their upper ends, as indicated at $k'$, and provided with clamping screws, so that the divided portions may be drawn together to take up any wear on the rods. The springs $i'$ serve to keep tension on the eccentrics and rods, and to relieve them from the weight of the frame.

The longitudinally adjustable portion O of the movable frame, consists of the hollow bar $m'$, the standards $n'\ n^2\ n^3$ and the upper cross-bar p. These standards support the journals for the shafts of the sole-clamps and the former.

The mechanism for imparting rotary motion to the sole-clamps and former, will be understood from an examination of Figs. 2, 4 and 10. A pulley P on the shaft K, on which the movable frame swings, receives motion from the driving shaft E by the belt o. A pinion q, attached to the pulley P, drives the gear Q, which runs on a stud, n, and is provided with a sprocket-wheel r. A chain or other belt R transmits motion from the sprocket-wheel r to the wheel s, which is connected by the clutch t with the shaft u, which at its inner end carries the pinion v which meshes with the gear w. The gear w is double or made long, and its inner part projects into and meshes with the teeth of the internal elliptoid gear T, which is secured on the shaft S, journaled in the lower cross bar $m'$ of the adjustable frame O. From the shaft S the motion is transmitted to the shafts of the sole-clamps and former by means of a train of gearing x, y, z z' at each side of the frame O. The irregular or ellipse-shaped gear T is introduced in order to impart a rotary motion at a variable speed to the sole-blanks, so that the cutting operation is rendered uniform, whether it takes place near the axis of revolution, as along the shanks, or at a greater distance therefrom, as at the heels and toes. In order to permit the use of the elliptoid gear, the transmitting mechanism, including the chain R, the clutch, the pinion v and gear w are mounted on a supplementary frame V, which oscillates on the shaft K, and permits the gear w to conform to the outline of the elliptoid gear T. Inside the gear is placed a form W, of a shape corresponding with that of the gear, and against the edge of which a roller $c^2$, Fig. 10, bears. This roller is concentric with the gear w, and causes it to maintain its proper mesh with the teeth of the elliptoid gear as the latter revolves. The gear w is sustained by a stud $d^2$ inserted in a suitable boss $e^2$ on the upper end of the frame V, and which stud projects through the gear and carries the roller $c^2$. The form W is fastened to the web of the gear in any suitable way. It is provided around its edge with a groove $f^3$, Fig. 10, with which a projecting flange $g^2$ on the roller $c^2$ engages, so that the supplementary frame V receives lateral support from the shaft S, and is prevented from springing outward. A tightener $h^3$, Fig. 2, may be used on the chain R. It is carried by a suitable arm on the frame V. The speed is reduced from the driving shaft by the belt and gearing shown, so that the elliptoid gear and the former and sole clamps make about six revolutions per minute,—a speed which I have found satisfactory in practical operation, although it may be either greater or less.

The supplementary frame V is provided at its lower end with a sleeve $j'$, which is fitted on the shaft K. It has a suitable boss in which the stud $n$ is inserted, and at its upper end it is provided with bosses, $k'$ and $e^2$, for the shafts $u$ and $d^2$. An arm $l'$ projects outward and supports the outer end of the shaft $u$.

The sprocket-wheel $s$ runs loose on the shaft $u$, except when connected thereto by the clutch $t$, which is operated by the hand-lever X. One member of the clutch is attached to the sprocket wheel $s$, while the other member $t'$ Figs. 1 and 10, is movable lengthwise of the shaft, being splined thereon. The pinion $v$ is secured on the inner end of the shaft. The movable member $t'$ of the clutch is connected with the hand-lever X by the slide $o'$ Fig. 10 having a segment which engages with the groove $q^2$. The slide $o'$ is pivoted to the lever at its inner end, and moves in a groove in the side of the boss $k'$, being held in place by the cap $p'$. The hand-lever X is pivoted on the frame V, at $r'$, and it is provided with a spring $s'$, which forces it toward the elliptoid gear and holds the clutch disengaged. A spiral spring may be placed between the members of the clutch, to force them apart as indicated at $f^4$, Fig. 10. The elliptoid gear has a projecting rim $u'$, which has a notch $v'$, Fig. 2, in which the lever X engages, when the clutch is thrown out. In order to cause the sole-clamps and former to revolve, the operator shifts the hand-lever X into the position represented by the dotted lines in the drawings, disengaging it from the notch $v'$ in the elliptoid gear, and engaging the clutch, so that the motion of the sprocket-wheel $s$ is transmitted to the gear $w$ which drives the elliptoid gear T, and from its shaft S motion is conveyed to the sole-clamps and former by the trains of gearing at the sides of the frame O. During the rotation of the elliptoid gear, the lever X rides on the flange $u$, but as soon as the revolution is completed, the lever snaps into the notch $v'$, and disconnects the clutch, and holds the gear from further movement until the lever is again shifted. It will thus be observed that the sole-clamps make one complete revolution and then remain stationary until again started into operation, and that the sole-blanks are rounded into the proper shape for soles during this movement. It will also be understood that during this movement, the movable frame J is caused to swing to and fro relatively to the cutter, by the former $f$ which bears on the guide Z during its rotation, thus causing the cutter to dress the sole-blanks Y to the same shape as the former, and also that the supplemental frame V has during this movement an independent oscillation on the shaft K, as the gear $w$ conforms to the shape of the elliptoid gear, with its teeth in mesh with the teeth thereof. It will be seen that the long axis of the elliptoid gear is arranged parallel with the length of the sole clamps, so that, as the heel and toe of the sole-blanks pass by the cutter, the speed of the rotation is reduced, thus compensating for the increased length of the cut which must be taken on the leather in consequence of the greater distance of these portions from the center of rotation, thereby securing uniformity in the cutting operation, and presenting to the cutter an equal amount of work during the whole revolution.

When at rest the movable frame occupies a position away from the cutter, to enable the operator to conveniently place the sole-blanks between the clamps. It is preferable to have the frame incline outward from the vertical, as represented by the full lines in Fig. 2, as thereby the blanks will remain in the blank-gages until the clamps are set up on them. The position of the movable frame relatively to the main-frame is determined by the length of the connection L, which, as represented in Fig. 12, is pivoted to the main frame, at $w'$, and is provided with a notch $x'$ on its lower edge, which engages with a lug $y^{10}$ on the movable frame, and holds it in the position mentioned. In order to present the sole-blanks to the cutter, the operator lifts the connection L, when the weights $h$ draw the frame toward the cutter, until the former rests against the guide Z, and then causes the soles to revolve by throwing in the clutch $t$ by means of the hand-lever X.

The sole-clamps $e\ e'$ are made adjustable to and from each other by the screw $y'$ and hand-wheel A'. The sole-clamps are made of any suitable shape or dimensions, according to the size of the soles to be rounded by the machine. They may be made so as to be easily changed,—being fitted on their shafts on taper bearings provided with keys by which the clamps are compelled to revolve with the shafts. One of the clamps, as $e'$, is pivoted on its shaft, so that it may adapt itself to sole-blanks differing in thickness at their ends, as indicated by the dotted lines in Fig. 5. The end of the shaft is flattened, and inserted in a recess in the clamp,—a pin or pivot $i^2$ being inserted through the clamp and the shaft. By this construction, the pivoted clamp is enabled to take a position with its face at an angle with that of the other clamp, when, as frequently happens, a number of sole-blanks are thicker at one end than at the other, thus securing an equal pressure on the blanks, and avoiding strain on the parts. The clamp may be attached to the shaft in any other manner which secures the same result.

The hand-wheel, A' is secured on a sleeve $a^3$, Fig. 5, threaded to fit the screw $y'$, and provided on its inner end with a circular flange $c^3$, which is held in place by the nut $d^3$, provided with an annular rim $e^3$ which is threaded onto the projecting portion $i^3$ of the frame. The screw $y'$ is prevented from turning by a key in the frame portion fitting a longitudinal key-way in the screw. The revolution of the hand-wheel A' will therefore cause the screw $y'$ to move lengthwise, and this motion is transmitted to the sole-clamp $e'$ by the anti-friction or ball-bearing $j^2$, and the shaft $k^2$. At its inner end, the screw $y'$ is provided with the plate or disk $l^2$, Fig. 6, which has a circular groove, for the ring of balls, $m^2$, on its inner face. The outer end of the shaft $k^2$ is provided with a disk $n^4$, which is also provided with a circular groove for the ring of balls.

$o^2$ is a cap or socket, which fits over the disk $n^4$, and is screwed onto the edge of the disk $l^2$, thus forming an inclosure containing the balls. As the shaft revolves, the disk $n^4$ turns with it, and the balls receive the end-thrust caused by the pressure used to clamp the sole-blanks between the sole-clamps, and relieve the friction which would otherwise be caused thereby. At the same time, the longitudinal motion in either direction, of the screw $y'$ is transmitted to the shaft $k^2$. At the other side of the movable frame, the end-thrust is relieved by a corresponding ball-bearing $p^3$, Figs. 4 and 5.

The sole-clamp $e$ is supported on a shaft, $q'$, Fig. 5, arranged to slide lengthwise through a bearing in the bar $n^2$, so that the former-clamp $r^3$ at the opposite end of the shaft may be withdrawn from its fellow, $r^4$, for the purpose of changing the former. A spring $s^2$, Fig. 5, surrounds the shaft $q'$ and bears at one end against a shoulder thereon, and at the other end against a collar or socket $t^2$ inserted in the bearing. This construction permits the former-clamp $r^3$ to be withdrawn from the corresponding clamp $r^4$, as indicated by the full and dotted lines in the drawings. One of the former-clamps is provided with pins, $u^2$, which project into holes in the other, through holes made for them in the former, so that the former is held in place and the clamps caused to revolve simultaneously thereby. The former-clamp $r^4$ is supported by the shaft $v^2$ arranged to revolve in a suitable bearing in the bar $n'$, and provided at its end with a grooved disk which bears against the balls of the anti-friction bearing $p^3$. A screw $x^2$ inserted in the projecting frame, serves to take up the wear in the ball bearing.

The clamps are driven from the shaft S by the trains of gears $x, y, z, z'$ on each side the movable frame. The gearing is similar on each side of the frame, except that the shaft $k^2$ is splined through its gear, $z'$, which is prevented from shifting laterally by the clip $y^2$ secured to the frame and entering a groove in the hub of the gear. The gears $x\, x$ are keyed or otherwise secured to the shaft S, and revolve therewith. The gears $x\, x$ and $z'\, z'$ are of the same size, so that the elliptoid gear T and the sole-clamps and former revolve simultaneously. The gears $y$ and $z$ revolve on studs inserted in the side-bars of the frame. The gears $y\, y$ are made of one-half the diameter of the gears $x$, and they have attached to them the eccentrics $l^3\, l^4$, which operate, in connection with the eccentric-rods $m^3\, m^4$, to cause the longitudinal reciprocating movement of the upper portion O of the movable frame. These eccentrics are made in one piece with their pinions, or attached thereto in any suitable manner,—as, for instance, the pins $o^3$, Fig. 8.

$p^4$, Fig. 9 represents the stud on which the pinion and the eccentric revolve, which is provided on its outer end with a nut and washer $q^2$ which holds the eccentric strap onto the eccentric. The lower ends of the eccentric-rods are pivoted at $u^3$, $u^4$ to the lower portion N of the movable frame. The eccentric-rod $m^4$ is provided with an opening through which the shaft S passes of sufficient dimensions to permit the vibration of the rod. As the eccentrics revolve the adjustable portion O of the frame moves up and down, the rods $h'\, h^2$ sliding in the frame N. The sole-clamps, former, and their driving mechanism, including the elliptoid gear T partake in this movement, as indicated by the full and dotted lines in Fig. 4. The effect of this movement in varying the relations of the the sole-blanks and the cutter, while the blanks are revolving in contact with the cutter, under the influence of the former, is illustrated in the diagram, Figs. 21 to 28 inclusive, which represent the various positions of the parts during a complete revolution of the blanks, at distances of about a quarter turn apart. As the eccentric revolves twice during one revolution of the shaft S, the adjustable portion O of the movable frame, will make two reciprocating movements during one revolution of the blanks. Fig. 21 represents the position of the blank and the cutter, with the center of rotation of the blank directly opposite the axis of revolution of the cutter-shaft,—this figure showing the relation of the parts when the movable frame is first moved up so as to bring the blanks against the cutter. In Fig. 22, the blank having made about a quarter of a revolution, the center I' is shifted above the axis of the cutter, in consequence of the movement of the frame O, and in Fig. 23, when the blank has made a half-revolution, the center has descended to the line of the axis of the cutter. At this time, the cutter is dressing the heel of the sole, the speed of rotation of the blank has been gradually reduced, because the gear $w$ is engaged with one of the more elongated portions of the elliptoid gear T. In Fig. 24, the center I' is below the axis of the cutter, in Fig. 25 it is again opposite it, in Fig. 26 it has risen above it, in Fig. 27 it is again opposite it, and in Fig. 28 it has again traveled below it. This construction facilitates the cutting, avoids unnecessary strain, and causes the machine to work freely and easily at all points in the revolution. The shifting motion of the frame O reduces the resistance between the former and guide, by presenting the former at a more favorable angle to the guide.

It will be understood that the path or arc through which the axis of the sole-clamps swings during their rotation is so small relatively to the length of the pivoted frame or carriage that it may be considered as a straight line, in the plane in which the cutter is located, and that the relative shifting of the cutter and sole-clamps just described takes place in a direction at an angle with such plane.

The construction of the cutter G will be understood from Figs. 13 to 18 inclusive.

C' C² are the knives, which are clamped between the head D' and the self-adjusting collar E', which is used to prevent springing the shaft in case of any variation in the width of the knives.

H' is a collar on the cutter-shaft F, against which a sleeve J', carrying the head D' bears. The inner surfaces of the head D' and the collar E' are provided with transverse grooves to receive the sides of the knives, as indicated at K' K², Fig. 16.

L' is a sleeve which is forced up against the collar E' by the jam-nuts M' M² fitting a threaded portion of the shaft. At its inner end the sleeve L' is provided with a collar, N', the inner surface of which is turned spherical, to correspond with the spherical surface of the collar E'. The hole in the collar E' through which the shaft F passes, is made tapering, as represented at O' in the sectional view, Fig. 15, so that the collar E' may adjust itself slightly to suit any irregularity or difference in width in the knives C' C², while still maintaining an effective clamping pressure upon them, when the jam-nuts are screwed up.

In order to dress the edges of the soles clean, and to prevent the formation of any fuzziness at the edges, which is especially likely to occur on the flesh side of the leather, I employ a revolving circular guard, the edge of which bears against the side of the blank, and is provided with a projecting flange or groove which draws the fuzz into the cutter and subjects it to the action of the knives so that it is entirely removed and the edges of the soles finished clean and neat,—in such condition that, for some classes of shoes, they may be used without any further dressing or "edge-trimming." These guards may be used on either or both sides of the blanks, and either or both of them may be movable or adjustable lengthwise of the shaft. In the construction represented in the accompanying drawings, I have shown two of these guards, both of which are movable lengthwise of the shaft, being connected together, by suitable mechanism, such for instance as that represented in Figs. 3 and 12, so that they may be separated from each other to expose the cutter, just before the blanks are presented thereto. The edge of the guard d which bears against the side of the blank is provided with an inclined or eccentric groove V', Fig. 13, which draws the uncut fuzz adhering to the corner of the edge of the sole into the knife C², by which it is removed. A corresponding groove, V², performs a similar function for the knife C'. In addition to the groove, inwardly projecting flanges U' U² carry the fuzz inside the cutting edges of the knives. The inner edge of these flanges is inclined or eccentric, preferably on the same lines with the grooves or channels V' V². These flanges terminate immediately in front of the knives,—their ends projecting inward a short distance inside the cutting edges. The grooves may be used without the internal flanges, with satisfactory results, but I prefer to employ both, as the fuzz is thereby brought positively inside the cutting edges of the knives. Instead of the grooves V' V², projecting flanges may be employed, which will give a continuous bearing on the side of the blank, and carry the fuzz inside the knives. The guard c is provided with a corresponding arrangement. The head D' and collar E' are notched on their peripheries, so as to permit their introduction inside the guards and the internal flanges U' U², as indicated at Q' Figs. 16 and 17.

The guard d is a cylinder of sufficient length to move over the knives, and provided with a grooved hub, P', Fig. 15 which slides on the sleeve L', being preferably splined or otherwise attached so as to revolve therewith. The adjustment of the guard d lengthwise of the shaft is indicated by the full and dotted lines in Fig. 15. The groove R' in the hub P' receives a shifter, $k^3$, Figs. 11 and 12, which is connected by an arm with a sleeve $l^5$ arranged to slide on a rod $m^3$ secured to the boxes on the main-frame. The sleeve $l^5$ has a lug $n^4$, Fig. 3, to which the upper end of the lever $o^4$ is connected by a suitable slotted joint. The lever $o^4$, is pivoted to the main-frame at $p^3$ and extends outward and is connected with the rod S', attached to the treadle lever T'. The operator, by depressing the outer end of the pivoted treadle lever T', shifts the lever $o^4$ on its pivot $p^3$, as indicated by the full and dotted lines in Fig. 3, and this movement is transmitted by the sleeve $l^5$ and shifter $k^3$, to the guard d, so as to move the latter lengthwise of the cutter-shaft, while revolving, and to expose the knives to the distance required by the thickness of any number of sole-blanks presented to the cutter. A spring, $q^5$, Fig. 3, serves to restore the parts to their former position,—the guard inclosing the knives. A weight may be used as an equivalent for the spring.

The guard c, if movable lengthwise of the shaft, may be connected with the lever $o^4$ so as to be shifted at the same time by the treadle T'. Only a limited amount of motion, if any, need be given to one of the guards,—which in the construction shown is the guard c,—just enough to permit the presentation of the blanks on the side of the guard,—the sole-clamp e being arranged in line with the edge of the guard. The hub of the guard c is provided with a groove, W' Fig. 14 in which a shifter $q^4$ Fig. 11, is fitted. This shifter is connected with a sleeve $s^3$, arranged to slide on the rod $m^3$, and is pivoted to the upper end of the lever $t^3$, which is pivoted to the main frame at $v^3$. A rod, $w^3$, serves to transmit the motion of the lever $o^4$ to the lever $t^3$,—the rod being arranged to slide through a hole in the lower end of the lever, and being provided with the adjusting nuts $x^3$, so that the amount of motion given to the guard $c$ may be varied. A spring on the rod $w^3$ insures the return movement of the guard.

The operator, having inserted and secured a batch of sole-blanks Y between the clamps $e\ e'$, depresses the treadle T', thereby separating the guards to the necessary distance to permit the blanks to enter between them, and, then, by releasing the treadle, allows the spring $q^3$ to bring the edges of the guards in contact with the sides of the leather after it has been presented to the cutter.

The guide against which the former bears when the machine is dressing the soles, is shown detached in Fig. 29. It consists of a ring, Z, of the same diameter on the outside as the cutter. It is supported by the bracket $I^2$ in a position which is substantially concentric with the cutter shaft F, but which may be adjusted in two directions at right angles with each other as indicated by the full and dotted lines, in Fig. 30. The bracket $I^2$ is attached to the side of the journal-box $b'$ by a screw passing through a slot, so that the bracket and guide can be adjusted up and down,— a rib or flange on the bracket projecting into the box serving to hold the bracket in position. The bracket carries a hollow hub $J^2$, through which the threaded stem $L^2$ passes. The stem is provided with jaws $U^3$, between which the guide Z is supported on a tube $X^2$, secured in place by the set-screw or other device $V^3$. The tube encircles the cutter-shaft, and is made of sufficient diameter to permit the requisite adjustment of the guide. The stem $L^2$, is provided with the nuts $T^2\ T^3$, by which the adjustment of the guide in the horizontal direction is effected. The hub or one of the nuts may be provided with a scale, which indicates the position when the guide Z is concentric with the shaft and cutter, or its adjustment therefrom in either direction. A scale also may be applied to the journal-box or bracket, to indicate the adjustment of the guide in the vertical direction. Three inches in diameter are suitable dimensions for the cutter and guide. Fig. 30 serves also to illustrate the relative positions of the guide and former when the axis of the rotation of the sole-clamps has been shifted past the cutter by the movement of the frame O.

In Fig. 19 I have represented a former of a shape which, although difficult, is exactly reproduced in the finished soles by my improved rounding machine. Fig. 20 represents one of the sole-clamps in face view. It is preferably recessed on its face, and may be made of any desired shape or dimensions.

It will be understood that the form of the variable speed gear may be modified without materially affecting the result sought. Thus the gear represented in face view in Fig. 32, and edge view in Fig. 33, has been employed with good results, being driven by the gear $w$, the movements of which are controlled by a roller bearing against the flange $s^4$. The motion of the gear $w$ will in this case be reversed, which may be readily accomplished by using a straight instead of a crossed belt $o$. The row of teeth $Z^4$ in the gear shown in Figs. 32 and 33 are disposed in the form of an outline of a sole. I prefer however to employ a gear of an ellipse-shaped or elliptoid form similar to that partially represented in Fig. 31. It will be observed that the flange $u'$ of this gear and the row of teeth $v^4$ are curved inward at $R^2$, and that the form W is given a corresponding shape, which arrangement facilitates the operation of the parts and the rounding of the soles by the cutter.

The blank-gages are supported by an arm or arms $E^2$ which extend outward from the cross-bar D and pass between the bars $m'$ and $g'$ of the movable frame J. The gages consist of two rods, $o^5$ and $o^6$, which bear against the sides of the sole-blank and the former above and below the shank, and of a curved arm $r^5$ which comes against the lower part of the former at one end and at the other is provided with a plate $r^6$ which supports the sole-blanks until they are clamped between the sole-clamps. These arms are adjustable horizontally and vertically, and they are made to slide up toward and away from the former and the sole-clamps. In the construction shown, the gages are supported by a standard $s^5$ which slides on the rods $t^4$ inserted in the end of the arm $E^2$, and arranged, if preferred, to swing on a pivot $u^4$, a clamping device $v^5$ being employed. The arms are attached to blocks adjustable lengthwise of the standard by set-screws or clamp-nuts. The arms $o^6$ and $r^5$ are secured by a single clamp-nut although relatively adjustable. The ends of the arms $o^5\ o^6$ which bear against the former, are provided with adjustable contact-pieces $x^4 x^5$. The operator moves the blank-gages up to the sole-clamps and into contact with the former, to enable him to place the sole-blanks properly in the sole-clamps, and then, after the clamps have been forced together so as to secure the blanks between them, the gages are moved away. I design to constitute the blank-gages the subject-matter of another application for Letters Patent.

It will be obvious to the skilled constructor that many changes may be made in the machine herein described, without departure from the principles of my invention. Thus, the cutter itself may be made movable, or it may be arranged so that its axis will travel past the axis of the sole-clamps, the variable rotation of the sole-clamps may be secured by any suitable mechanism, the carriage for the former and the sole-clamps may be constructed in any suitable way, cams may be substituted for the eccentrics, any suitable form of cutter may be used, the guards over the cutter may be arranged in various different ways, gearing may be used instead of the chain R, the cutter-shaft may be placed with its axis vertical instead of horizontal, and the corresponding changes made in the arrangement of the carriage and the driving mechanism, and various other modifications introduced into the machine still employing the inventions herein described and claimed.

The gearing at the sides of the movable frame is protected by the covers, $w^4$, Fig. 7,—not shown in Fig. 4. The sides of the bosses in the frame O may be cut away, as indicated at $y^4$, Fig. 4, so as to permit this frame to approach as near as possible to the main-frame and the cutter.

I claim—

1. The combination, in a sole-rounding machine, of a rotating cutter, a vibrating carriage, revolving sole-clamps and former, and means substantially as described for shifting the sole-clamps while revolving out of the path of their vibration relative to the cutter, substantially as described.

2. The combination, in a sole-rounding machine, of a rotating cutter, a vibrating carriage, revolving sole-clamps and former, and means for shifting the sole-clamps while revolving across the path of their vibration relative to the cutter, substantially as described.

3. The combination, in a sole-rounding machine, of a relatively movable rotating cutter and revolving sole-clamps and former, and means substantially as described for shifting the cutter and clamps relative to each other out of the path of their relative motion, substantially as described.

4. The combination, in a sole-rounding machine, of a relatively movable rotating cutter and revolving sole-clamps and former, a vibrating carriage or frame consisting of two relatively adjustable portions, and mechanism substantially as described for shifting one of the said parts relatively to the other, substantially as described.

5. The combination, in a sole-rounding machine, of a rotating cutter, a movable carriage carrying revolving sole-clamps and a former, and consisting of two relatively movable portions, one of which is provided with a revoluble eccentric or cam acting upon a part of the other portion, substantially as described.

6. The combination, in a sole-rounding machine, of a main frame, supporting a rotating cutter, a movable carriage supported thereon and carrying revolving sole-clamps and a former, and consisting of two relatively movable portions, and mechanism for shifting the portion carrying the sole-clamps and the former while these parts revolve, substantially as described.

7. The combination, in a sole-rounding machine, of the frame A carrying rotating cutter G, the movable carriage J, formed of the frame N and the relatively adjustable frame O, supporting the revolving sole-clamps $e$ $e'$ and former $f$, and a revolving cam or eccentric operating to produce a relative movement of the frames, substantially as described.

8. The combination, in a sole-rounding machine, of a rotating cutter, and a carriage supporting revolving sole-clamps and a former, the cutter and carriage being relatively movable in one direction to cause the cutter to dress the soles to the shape of the former, and also relatively adjustable in a lateral direction while the clamps revolve and reciprocate under the influence of the former, substantially as described.

9. The combination, in a sole-rounding machine, of a relatively movable rotating cutter, a suitable vibrating carriage, and revolving sole-clamps and a former, and mechanism substantially as described, adapted to revolve the sole-clamps at a variable speed, whereby the rotation of the sole-clamps is retarded, while the cutter is dressing the toe and heel, substantially as described.

10. The combination, in a sole-rounding machine, of a relatively movable rotating cutter, a suitable vibrating carriage, and revolving sole-clamps and a former, and variable speed gearing substantially as described arranged to revolve the sole-clamps at a varying rate, whereby the rounding of the heel and toe is effected at a reduced speed, substantially as described.

11. The combination, in a sole-rounding machine, of a relatively movable rotating cutter and revolving sole-clamps and a former, and an elliptical or elliptoid gear arranged to transmit rotary motion to the sole clamps at a variable speed, substantially as described.

12. The combination, in a sole-rounding machine, of a rotating cutter, the pivoted frame carrying revolving sole-clamps and a former, the elliptical or elliptoid gear T, and a movable arm carrying a gear meshing with said gear T, substantially as described.

13. The combination, in a sole-rounding machine, of a relatively movable rotating cutter and carriage, supporting revolving sole-clamps and a former, mechanism for revolving the sole-clamps at a variable speed, and mechanism for shifting the cutter and carriage relatively to each other while the clamps revolve and reciprocate under the influence of the former substantially as described.

14. The combination, in a sole-rounding machine, of a relatively movable rotating cutter and a pair of sole-clamps, a suitable carriage and a former, one of the clamps being rigid on its shaft and the other pivoted on its shaft so as to revolve therewith but movable at its ends relative to the rigid clamp to compensate for stock different in thickness at the heel and toe, substantially as described.

15. The combination, in a sole-rounding machine, of the sole-clamps, the rotating cutter and a guard applied thereto and provided on its edge with an inclined or eccentric groove or flange, substantially as described.

16. The combination, in a sole-rounding machine, of the sole-clamps, the rotating cutter, and a guard applied thereto and provided on its edge with an inclined or eccentric groove or flange, and with an inwardly projecting inclined or eccentric flange or rib, substantially as described.

17. The combination, in a sole-rounding machine, of the sole-clamps, a rotating cutter, and two guards applied to the cutter and provided on their opposing edges with inclined or eccentric grooves or flanges, substantially as described.

18. The combination, with the revolving sole clamps $e\ e'$, of the cutter-shaft F, knives $C'\ C^2$, and heads $D'\ E'$ one of which is self-adjusting, substantially as described.

19. The combination, with the revolving sole-clamps $e\ e'$ of the cutter shaft F, head $D'$, self-adjusting head $E'$, sleeve or collar $L'$, and clamping nut $M'$, substantially as described.

20. The combination, with the cutter-shaft F, of the knives $C'\ C^2$, head $D'$, self-adjusting head $E'$, sleeve $L'$, and adjustable guard $d$, substantially as described.

21. The combination, with the cutter-shaft F, of the knives $C'\ C^2$, head $D'$, self adjusting head $E'$, sleeve $L'$, and adjustable guards $c$ and $d$, substantially as described.

22. The combination, with the cutter G, of the adjustable guards $c$ and $d$, and means for operating them simultaneously, substantially as described.

23. The combination, with the cutter G, of the adjustable guards $c$ and $d$, levers $o^4$ and $t^4$, rod $w^3$ and treadle lever $T'$, substantially as described.

24. The combination with the sole-clamps $e\ e'$, of the cutter-shaft F, knives $C'\ C^2$, heads $D'\ E'$, one of which is self-adjusting, and the adjustable guard $d$, adapted to carry uncut portions of the stock into the cutters, substantially as described.

25. The combination, with a rotating cutter, of the movable carriage carrying the revolving sole-clamps and former, gearing at each side for revolving the sole-clamps and the former, the shaft S, and means for imparting rotary motion at a variable speed to the said shaft, substantially as described.

26. The combination, with a rotating cutter, of the movable carriage, carrying the revolving sole-clamps and former, gearing at each side for revolving the sole-clamps and the former, the shaft S, elliptical or elliptoid gear T, and movable driving pinion $w$, substantially as described.

27. The combination, with a rotating cutter, of the movable frame carrying the revolving sole-clamps and former, the gearing at each side for revolving the sole-clamps and the former, the shaft S, elliptical or elliptoid gear T, movable driving pinion $w$, movable support V and means for driving the pinion, substantially as described.

28. The combination, with a rotating cutter, of the movable frame J, consisting of two relatively movable portions, one of which carries the revolving sole-clamps and the former, and is provided with two trains of gearing, the shaft S, and the eccentrics or cams $l^3\ l^4$, adapted to produce a reciprocating motion between the two portions of the frame, substantially as described.

29. The combination, with a rotating cutter, of the movable frame J consisting of two relatively movable portions, one of which carries the revolving sole-clamps and former, and is supported on the other by a spring or springs, and means for reciprocating the relatively movable portion, substantially as described.

30. The combination, with a rotating cutter, of the movable carriage carrying the revolving sole-clamps and former, and the adjustable guide Z, arranged to be adjusted in two directions at right angles with each other, and means for shifting the sole-clamps and former relatively to the cutter while revolving under the influence of the former, substantially as described.

31. The combination, with a rotating cutter, of a movable carriage carrying the sole-clamps and former, a variable speed gear and suitable intermediate driving mechanism, and a movable gear supported on a movable supplementary carrier and arranged to impart rotary motion to the variable speed gear, substantially as described.

HENRY LOEWER.

Witnesses:
JOSEPH A. CRANE,
C. G. CRANNELL.